US009528240B2

(12) United States Patent
Humphries et al.

(10) Patent No.: US 9,528,240 B2
(45) Date of Patent: Dec. 27, 2016

(54) SAFETY EDGE SPORTS CHANNEL

(71) Applicant: ACO Polymer Products, Inc., Chardon, OH (US)

(72) Inventors: Derek Humphries, Gold Canyon, AZ (US); James McConnell, Montville, OH (US); Larry Hunt, Huntsburg, OH (US)

(73) Assignee: ACO POLYMER PRODUCTS, INC., Mentor, OH (US)

( * ) Notice: Subject to any disclaimer, the term of this patent is extended or adjusted under 35 U.S.C. 154(b) by 445 days.

(21) Appl. No.: 13/690,788

(22) Filed: Nov. 30, 2012

(65) Prior Publication Data
US 2013/0142573 A1 Jun. 6, 2013

Related U.S. Application Data

(60) Provisional application No. 61/566,195, filed on Dec. 2, 2011.

(51) Int. Cl.
*E01C 11/22* (2006.01)
*E02B 11/00* (2006.01)
*E01C 13/08* (2006.01)
*E01C 13/02* (2006.01)

(52) U.S. Cl.
CPC ........... *E02B 11/005* (2013.01); *E01C 13/083* (2013.01); *E01C 11/22* (2013.01); *E01C 11/227* (2013.01); *E01C 13/02* (2013.01)

(58) Field of Classification Search
CPC ........... E01C 11/22; E01C 13/00; E01C 13/02
USPC .... 404/2, 4; 277/605, 645; 405/43, 118, 119
See application file for complete search history.

(56) References Cited

U.S. PATENT DOCUMENTS

| 4,699,544 | A | | 10/1987 | Karbstein |
| 4,747,601 | A | * | 5/1988 | Glachet ..................... 277/628 |
| 5,647,689 | A | * | 7/1997 | Gunter ................... E01C 13/00 404/2 |
| 5,647,692 | A | * | 7/1997 | Gunter ................. E01C 11/227 404/2 |
| 5,853,265 | A | | 12/1998 | Gunter |
| 6,170,796 | B1 | | 1/2001 | Gunter |
| 6,202,358 | B1 | * | 3/2001 | Janesky ........................... 52/16 |
| 2010/0148452 | A1 | * | 6/2010 | Westhoff et al. ............. 277/605 |

FOREIGN PATENT DOCUMENTS

| DE | 19526985 A1 | * | 2/1996 |
| EP | 310902 A | * | 4/1989 |
| JP | 60231068 A | * | 11/1985 |

* cited by examiner

*Primary Examiner* — Sunil Singh
(74) *Attorney, Agent, or Firm* — Pearne & Gordon LLP

(57) ABSTRACT

A drainage channel includes a body configured to receive runoff from an adjacent surface; and a resilient edge secured to the drainage channel body. The resilient edge includes an opening extending longitudinally therethrough such that a wall of the resilient edge is capable of deforming inwardly towards the opening.

20 Claims, 8 Drawing Sheets

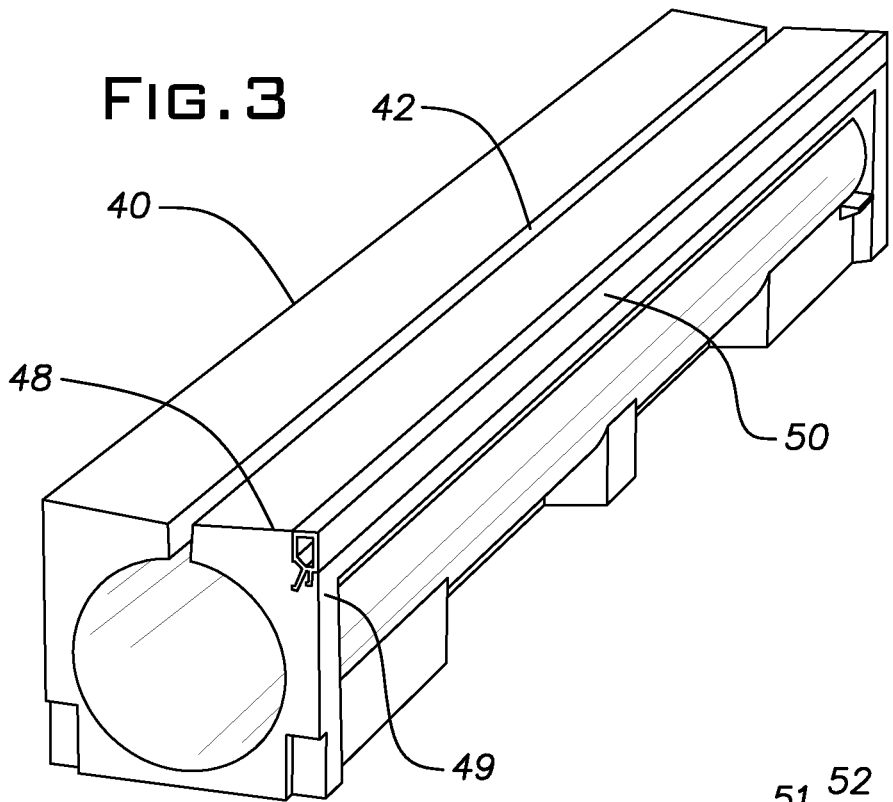
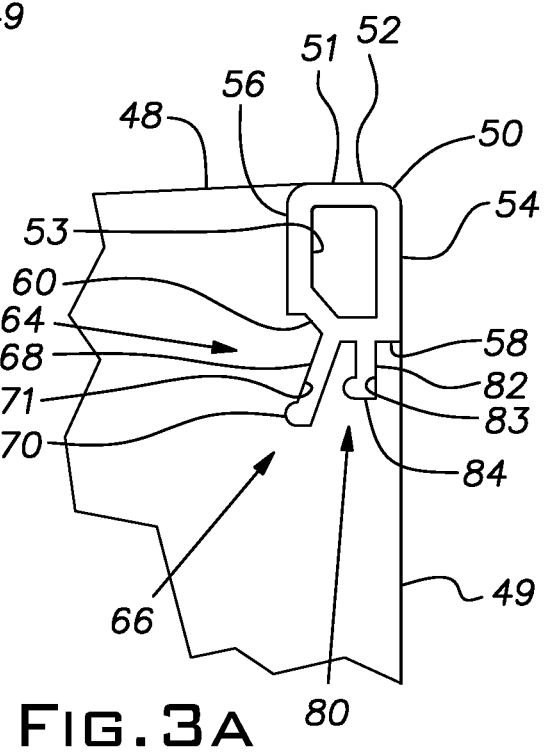

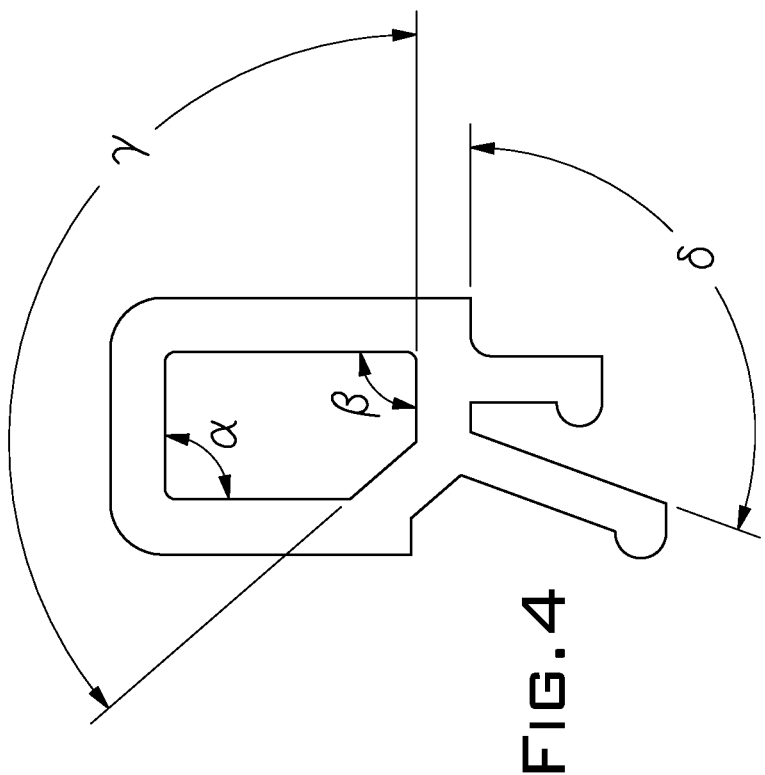

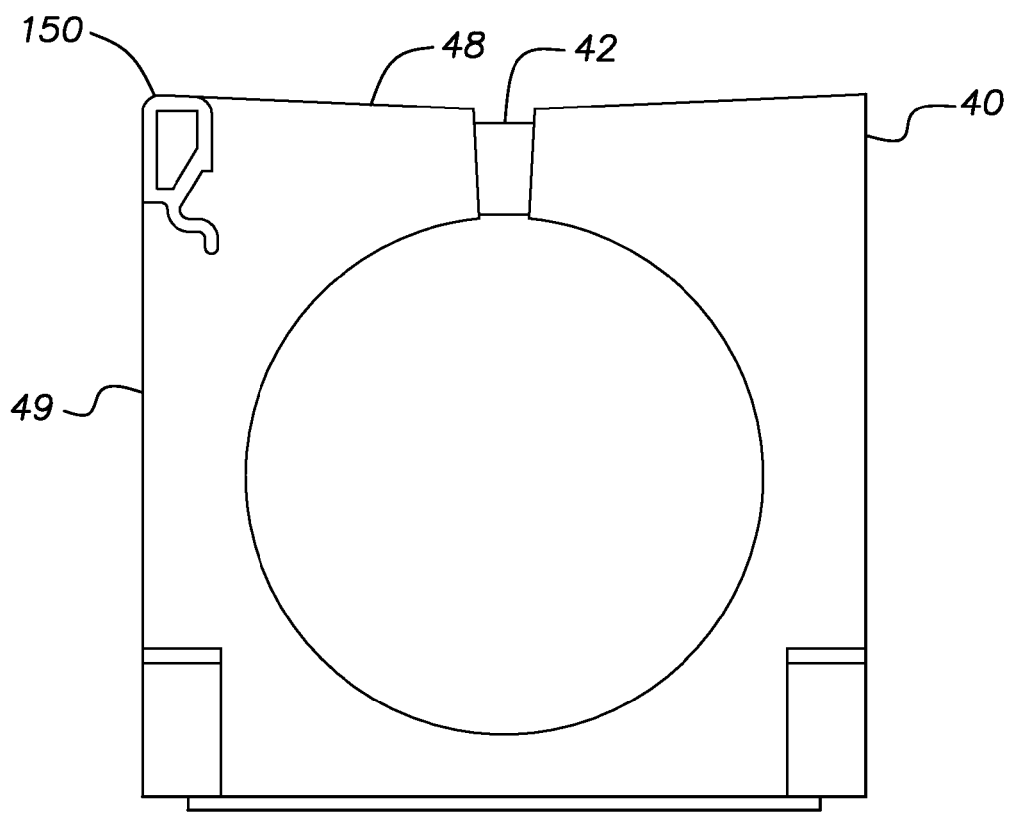
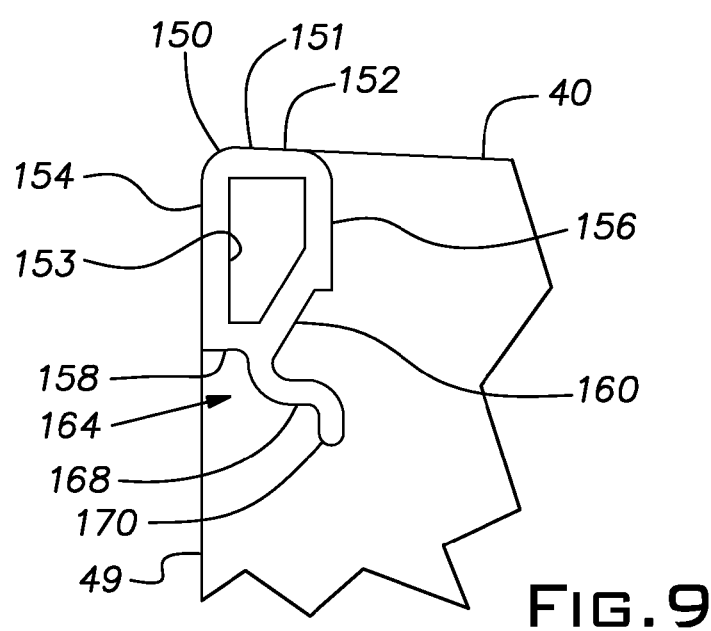

SAFETY EDGE SPORTS CHANNEL

CROSS-REFERENCE TO RELATED APPLICATIONS

This application claims the benefit of U.S. Provisional Patent Application Ser. No. 61/566,195 entitled "SAFETY EDGE SPORTS CHANNEL" which was filed on Dec. 2, 2011. The entirety of the aforementioned application is herein incorporated by reference.

FIELD OF THE INVENTION

The present invention relates generally to drainage channels, and more particularly, to an edge configuration for a drainage channel.

BACKGROUND

Drainage channels are often provided adjacent to athletic playing fields to receive liquid and debris runoff from the fields. These drainage channels are typically formed from a hard material that can potentially injure an athlete falling on the drainage channel, and particularly, upon striking a hard edge of the channel.

SUMMARY

According to one example described herein, an edge configuration for a drainage channel includes: an elongated body formed of an elastically deformable material; a hollowed portion extending longitudinally through the elongated body; and an attachment structure extending from the elongated body, wherein the elongated body includes at least four walls surrounding and enclosing the hollowed portion within the elongated body.

According to another example described herein, an edge configuration for a drainage channel includes: an elongated body formed of an elastically deformable material; and a first attachment portion extending from the elongated body, wherein the first attachment portion extends diagonally from a bottom wall of the elongated body.

Accordingly to yet another example described herein, a drainage channel includes a body configured to receive runoff from an adjacent surface; and a resilient edge secured to the drainage channel body. The resilient edge includes an opening extending longitudinally therethrough such that a wall of the resilient edge is capable of deforming inwardly towards the opening.

BRIEF DESCRIPTION OF THE DRAWINGS

The foregoing and other aspects will become apparent to those skilled in the art to which the present disclosure relates upon reading the following description with reference to the accompanying drawings.

FIG. 3 illustrates a perspective view of an example drainage channel having a drainage channel configuration.

FIG. 3A illustrates an enlarged end view of a portion of the drainage channel and the drainage channel configuration.

FIG. 4 illustrates a cross sectional view of the drainage channel configuration of FIG. 3.

FIG. 4A illustrates a front elevational view of the drainage channel configuration of FIG. 3.

FIG. 8 illustrates an end view of the drainage channel with the drainage channel configuration of FIG. 7.

FIG. 9 illustrates an enlarged end view of a portion of the drainage channel and the drainage channel configuration of FIG. 7.

DETAILED DESCRIPTION

Figure 1:
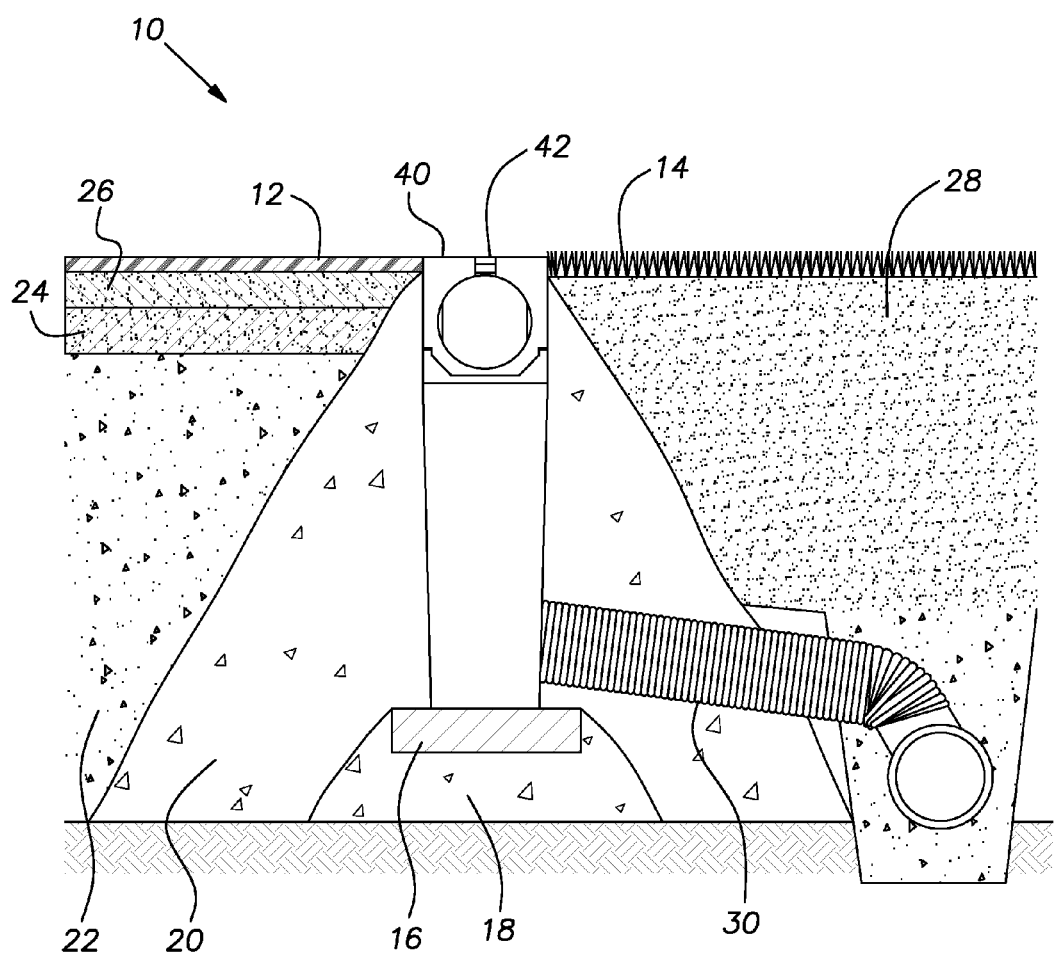
FIG. 1 illustrates a sectional view of an example drainage channel installed in an athletic field.

FIG. 1 illustrates an example athletic field 10 including a track surface 12 and a grass surface 14. A drainage channel 40 can be positioned between the track surface 12 and grass surface 14. The drainage channel 40 can receive water, runoff, debris, or the like from either or both the track surface 12 and grass surface 14, thus providing a drainage feature for the athletic field 10. As will be described in more detail below, the drainage channel 40 can include a resilient edge (not shown) positioned near the grass surface 14. This edge is of a material and/or a structural configuration to provide a relatively soft feature having a reduced resistance to external force as compared to the remainder of the drainage channel 40. As such, the channel edge can provide a resilient contact area for a person or thing that may engage the channel edge.

The athletic field 10 can optionally include a variety of backing support layers for supporting the track surface 12, grass surface 14, and the drainage channel 40. For example, the drainage channel 40 can be supported by a brick layer 16 although other footing arrangements may optionally be provided. As shown, the brick layer 16 can be positioned directly below and in contact with a bottom surface of the drainage channel 40, such that the drainage channel 40 can rest on the brick layer 16. The brick layer 16 can comprise a number of different materials, such as concrete. One or more bricks can be provided, and can be placed under opposing longitudinal ends of the drainage channel 40. However, any number of bricks could be positioned along the length of the drainage channel 40 to provide support.

In a further example, the brick layer 16 can be supported by a bedding mortar layer 18 or other support arrangement to stabilize and properly maintain orientation of the brick layer 16 in the proper position. The bedding mortar layer 18 can be positioned below the brick layer 16, such that the bedding mortar layer 18 can support both the brick layer 16 and the drainage channel 40. The bedding mortar layer 18 can comprise a number of different support materials, such as concrete, or the like. In one example, during installation, the bedding mortar layer 18 may still be wet and not completely cured when placing the brick layer 16 relative to the bedding mortar layer 18. As such, proper orientation of the brick layer 16 can be achieved and the bedding mortar layer 18 can closely conform to the shape of the surfaces of the brick layer 16. As such, once cured, the bedding mortar layer 18 can support the brick layer 16 with relatively little movement between the two layers.

A concrete backing layer 20 can be poured against sidewalls of the drainage channel 40 to provide additional support to maintain the drainage channel 40 in the proper upright orientation. Once the concrete backing layer 20 has substantially dried and hardened, the concrete backing layer 20 can be surrounded by a supporting layer. For example, underneath the track surface 12, the concrete backing layer 20 can be surrounded by a gravel material layer 22. Underneath the grass surface 14, the concrete backing layer 20 can be surrounded by an asphalt layer 28. A variety of different materials could be provided in place of the gravel material layer 22 and the asphalt layer 28.

An asphalt binder layer 24 can be provided between the gravel material layer 22 and an asphalt top 26. Once the asphalt binder layer 24 and asphalt top 26 have sufficiently hardened, the track surface 12 can be provided on top of the asphalt top 26. The track surface 12 can include a number of different elastomer-like materials, such as polyurethane, or the like. The track surface 12 can be provided adjacent an upper sidewall of the drainage channel 40, such that the track surface 12 can contact the drainage channel 40.

Figure 2:
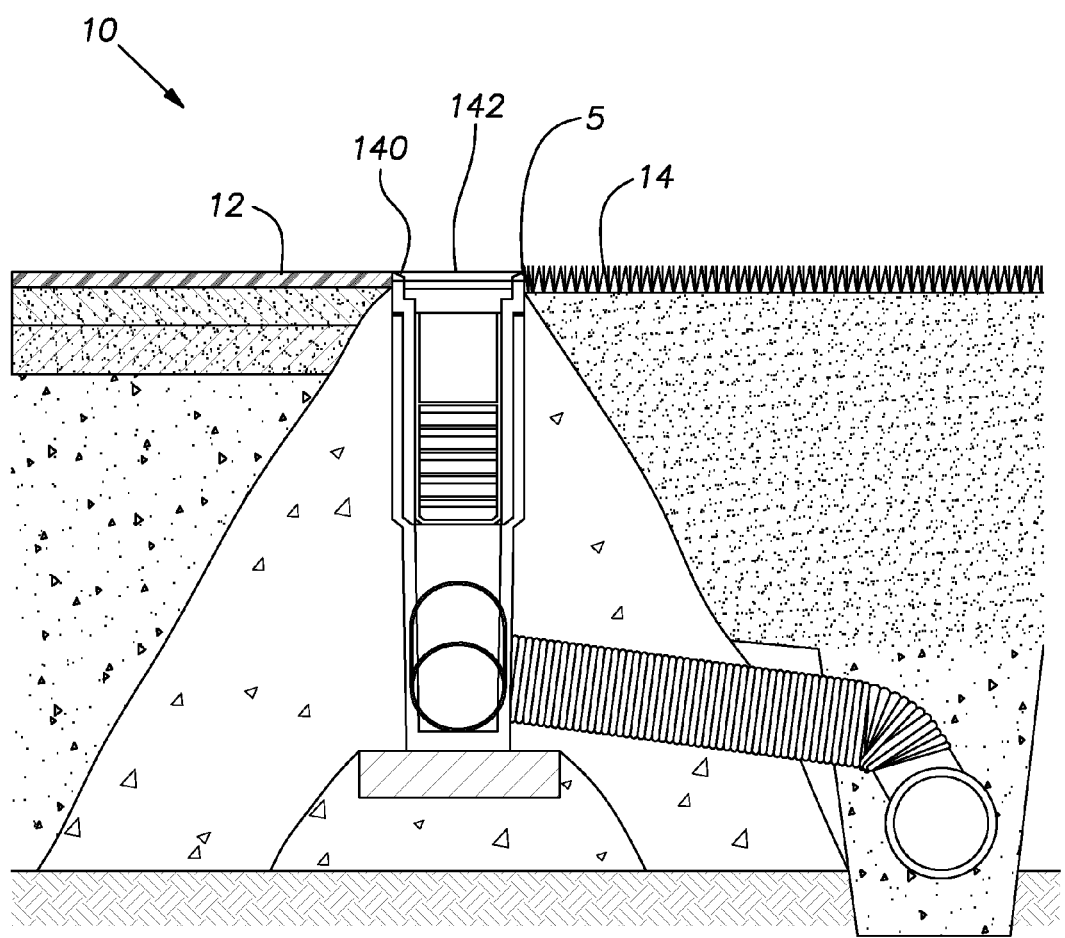
FIG. 2 illustrates a sectional view of another example drainage channel installed in an athletic field.

As further illustrated, the grass surface 14 can be provided on top of the asphalt layer 28. Although not required in all examples, the grass surface 14 can be attached to the asphalt layer 28 to support and properly seat the grass surface 14. The grass surface can include a natural grass surface, artificial turf, or any other suitable surface configurations. For instance, the grass surface 14 can include any type of artificial turf or playing field, such as synthetic fiber turf, field turf, synthetic track material, sand, water, or the like. Moreover, while the surface is described herein as a grass surface, it can instead be comprised of concrete, asphalt, or any other suitable surface. Accordingly, the grass surface 14 shown in the examples of FIGS. 1 and 2 is not intended to be limiting upon the type of surface against which the drainage channels can be applied.

The drainage channels described herein can include a wide range of configurations. For example, as shown in FIG. 1, drainage channel 40 can include an opening 42 through which the drainage channel 40 can receive water, runoff, debris, or the like from either or both the track surface 12 and grass surface 14. The opening 42 can extend partially or completely along the length of the drainage channel 40. Similarly, the opening 42 can be provided continuously or non-continuously along the drainage channel 40, such that the opening 42 could include a plurality of openings.

The drainage channel 40 can be provided in fluid communication with a drainage assembly 30 such that the drainage assembly 30 receives the water, runoff, debris, or the like from the drainage channel 40. The drainage assembly 30 can extend along a downward slope away from the drainage channel 40 such that the water, runoff, and debris can relatively easily flow through the drainage assembly 30 with minimal backup or clogging. Though not shown in the example, the drainage assembly 30 can be provided in communication with a sewage or evacuation system, such that the drainage assembly 30 can allow the water, runoff, and debris to exit the athletic field 10. In one example, the drainage assembly 30 could include a pipe, tube, or other such material that can receive and convey water, runoff, and debris from the drainage channel 40.

The athletic field 10 is generically/schematically shown in FIG. 1, and need not be a limitation on further examples of the present disclosure. Specifically, one or more of the subsurface layers could be replaced with a different layer and/or removed. Similarly, the drainage assembly 30 is not drawn to scale and is merely intended to represent one example structure that could remove the water, runoff, and debris from the drainage channel 40. FIG. 1 therefore depicts only one possible example of an athletic field 10, though other configurations of the athletic field 10 are envisioned. In addition, only a cross-section of the athletic field 10 is shown in FIGS. 1 and 2. The drainage channels can extend partially or completely around the athletic field 10 between the track surface 12 and grass surface 14.

Referring now to FIG. 2, a second example of a drainage channel is shown. The drainage channel 140 can be provided in a similar or identical environment as the drainage channel 40 shown and described above with respect to FIG. 1. For instance, the drainage channel 140 can be provided in the athletic field 10 between the track surface 12 and grass surface 14. Although not required, the drainage channel 140 can be supported by the same subsurface layers as in FIG. 1, including the brick layer 16, bedding mortar layer 18, the concrete backing layer 20, the gravel material layer 22, the asphalt binder layer 24, asphalt top 26, and the asphalt layer 28. Optionally, the drainage assembly 30 can also be similar to the example shown in FIG. 1. The drainage channel 140 can differ from drainage channel 40 in that drainage channel 140 can include a wider opening 142. The opening 142 can receive the water, runoff, debris, from the track surface 12 and grass surface 14. As with the drainage channel 40 in FIG. 1, drainage channel 140 can also include a resilient edge 5, which will be described in more detail below.

FIG. 3 illustrates a perspective view of drainage channel 40; and FIG. 3A illustrates an enlarged view of a portion of the drainage channel 40 having a resilient edge 50. The resilient edge 50 can be provided at an upper corner of the drainage channel 40 adjacent the grass surface 14. As will be described in more detail below, the resilient edge 50 can be cast into the drainage channel 40 such that the resilient edge 50 is substantially non-removable from the drainage channel 40.

The resilient edge 50 can include a flexible, elastically deformable material that is softer than remaining portions of the drainage channel 40. More specifically, the resilient edge 50 can have a reduced resistance to external force as compared to remaining portions of the drainage channel 40. The resilient edge 50 can comprise any number of elastically deformable materials. For instance, the resilient edge 50 can include a polyvinylchloride, vinyl rubber, nearly any type of elastomer, or the like. The resilient edge 50 is not limited to these materials, however.

The resilient edge 50 can include a contact portion 51. The contact portion 51 can define an upper portion of the resilient edge 50 that is exposed when the resilient edge is secured to the drainage channel 40. The resilient edge 50 can have an elongated body with a generally rectangular shaped cross-section and a hollowed portion 53 extending longitudinally through the body. As shown, the hollowed portion, or opening, 43 is bound by top, bottom, and side walls 52, 54, 56, 58, 60 of the elongated body. The opening 53 can allow the contact portion 51 to deform, such that the contact portion 51 can deflect inwardly towards the opening 53, thereby allowing the resilient edge 50 to be flexible and elastically deformable.

The contact portion 51 can include a top wall 52 defining a top surface of the resilient edge 50. The resilient edge 50 can be arranged such that the top wall 52 can be substantially flush with the top wall 48 of the drainage channel 40. As shown, the top wall 52 and top wall 48 can, together, define a substantially level upper surface of the drainage channel 40. Placement of the resilient edge 50 need not be limited to the example shown herein. Rather, the resilient edge 50 could be arranged with the top wall 52 slightly higher or above the top wall 48, such that the top wall 52 defines an upward step from the top wall 48. Along these lines, the resilient edge 50 could also be arranged with the top wall 52 slightly lower than or below the top wall 48 such that the top wall 52 defines a downward step from the top wall 48. Further, the top wall 52 and top wall 48 are not limited to forming a perfectly planar surface. The top wall 52 can be positioned in relatively close proximity to the top wall 48 such that no gap or a relatively small gap exists between the top wall 52 and top wall 48. Accordingly, the top wall 52 and top wall 48 can be in close proximity such that the contact portion 51 can abut and/or contact the drainage channel 40.

The top wall 52 can include a number of different sizes and shapes. For instance, in one example, the top wall 52 can have a length from an first side wall 54 to an second side wall 56 of about 14 millimeters (0.55 inches). However, the top wall 52 could be longer or shorter in other examples. Similarly, the top wall 52 can include slightly rounded, beveled edge, though, in other examples, the top wall 52 could have square edges, or the like.

The top wall 52 can be elastically deformable such that the top wall 52 can deflect. More specifically, if the top wall 52 is contacted or a force is applied, the top wall 52 can deflect inwardly towards the opening 53 or outwardly away from the opening 53. Accordingly, in one example, an athlete playing on the grass surface 14 may come into contact with the top wall 52. Due to the flexible, elastically deformable characteristics of the resilient edge 50, the top wall 52 can deform in response to the force from the athlete.

The contact portion 51 can further include a first side wall 54 defining a side outer surface of the resilient edge 50. The first side wall 54 can face the grass surface 14 of the athletic field 10. The resilient edge 50 can be arranged such that the first side wall 54 can be substantially flush with a side wall 49 of the drainage channel 40. As shown, the first side wall 54 and side wall 49 can, together, define a substantially level outer side surface of the drainage channel 40. However, the placement of the resilient edge 50 need not be limited to the example shown herein. Rather, the resilient edge 50 could be arranged with the first side wall 54 offset with respect to the side wall 49, such that the first side wall 54 and side wall 49 define a non-planar surface. Along these lines, the resilient edge 50 could be arranged with the first side wall 54 extending further out or further in with respect to the side wall 49. Accordingly, the first side wall 54 and side wall 49 are not limited to forming a perfectly planar surface. Furthermore, the first side wall 54 can be positioned in relatively close proximity to the side wall 49 such that no gap or a relatively small gap exists between the first side wall 54 and side wall 49. Accordingly, the first side wall 54 and side wall 49 can be in close proximity such that the contact portion 51 can abut and/or contact the drainage channel 40.

The first side wall 54 can include a number of different sizes and shapes. For instance, in one example, the first side wall 54 can have a length of about 20 millimeters (0.78 inches). However, the first side wall 54 could be longer or shorter in other examples. Similarly, the first side wall 54 can include a slightly rounded, beveled edge at one end (top end) and a square edge at an opposing second end (bottom end). However, in further examples, either or both of the ends of the first side wall 54 could have square edges, rounded beveled edges, or the like. As with the top wall 52, the first side wall 54 can be elastically deformable such that the first side wall 54 can deflect. If the first side wall 54 is contacted or a force is applied, the first side wall 54 can deflect inwardly towards the longitudinal opening 53 or outwardly away from the opening 53. Accordingly, if an athlete comes into contact with the first side wall 54, the first side wall 54 can deform and/or deflect and therefore provide a comfortable contact area.

The resilient edge 50 can further include a second side wall 56 and a bottom wall 58. The resilient edge 50 can also include an intermediate wall 60 positioned between the second side wall 56 and bottom wall 58. As such, the second side wall 56 can extend between the top wall 52 at one end and the intermediate wall 60 at an opposing second end. The second side wall 56 can extend perpendicularly with the top wall 52, such that an internal angle ($\alpha$) between the second side wall 56 and top wall 52 is about 90°. The bottom wall 58 can extend between the first side wall 54 at one end and the intermediate wall 60 at an opposing second end. As with the second side wall 56, the bottom wall 58 can extend perpendicularly with the first side wall 54, such that an internal angle ($\beta$) between the bottom wall 58 and first side wall 54 is about 90°. The intermediate wall 60 can extend diagonally between the second side wall 56 and bottom wall 58. In one example (see FIG. 4), the intermediate wall 60 can form an angle ($\gamma$) of about 50° with the bottom wall 58, however other angles are envisioned.

The sizes, shapes, and angles shown and described herein are merely one possible example and are not intended to be limiting upon the resilient edge 50. For instance, the internal angle between either of the second side wall 56 and top wall 52 or the bottom wall 58 and first side wall 54 need not be limited to 90°. Rather, a wide range of angles can be provided that are greater or less than 90°. Similarly, while the intermediate wall 60 is shown to extend diagonally between the second side wall 56 and bottom wall 58, other angles or orientations of the intermediate wall 60 are envisioned. Even further, the intermediate wall 60 may not be provided at all in some examples, such that the second side wall 56 can be attached directly to the bottom wall 58. As such, the sizes, lengths, thicknesses, shapes, etc. of any of the walls of the contact portion 51 can be varied while the resilient edge 50 still retains a similar function.

Referring still to FIGS. 3 and 4, the resilient edge 50 can further include an attachment structure 64. The attachment structure 64 can assist in attaching the resilient edge 50 to the drainage channel 40. More specifically, the attachment structure 64 can extend from the bottom wall 58 and into an adjacent portion of the drainage channel 40, though other locations and orientations of the attachment structure 64 are envisioned. The resilient edge 50 and the attachment structure 64 can be monolithically formed as a one-piece structure and can have a substantially R-shaped cross-section.

The attachment structure 64 can include a first attachment portion 66. The first attachment portion 66 can be cast into the concrete of the drainage channel 40, such that the first attachment portion 66 can attach the resilient edge 50 to the remaining portions of the drainage channel 40.

The first attachment portion 66 can include a first leg portion 68 that projects from the bottom wall 58 at a first end and into a drainage channel recess 71 of the drainage channel 40 towards a second end. The first leg portion 68 can extend in a substantially linear direction, such that the first leg portion 68 is straight. However, the first leg portion 68 could be non-linear in further examples, such as by having bends, curves, protrusions, or the like. For instance, the first attachment portion 66 could instead include the attachment structure 164 shown and described below with respect to FIGS. 7 to 9.

The first leg portion 68 can extend diagonally into the concrete at an angle with respect to the bottom wall 58. For instance, in one example, the first leg portion 68 can extend at an angle of about 20° with respect to the side wall 49 and first side wall 54. As shown in FIG. 4, the first leg portion 68 can form an angle (δ) of about 110° with the bottom wall 58. However, the first leg portion 68 could extend at any range of angles. For example, the first leg portion 68 could be parallel to the side wall 49 in one example, or to the top wall 48 in another example. In other examples, however, the first leg portion 68 could extend at a number of angles between extending upwardly towards the top wall 48 or extending sideways towards the side wall 49. In further examples, the first leg portion could extend parallel to the side wall 49 (e.g., extending substantially vertically up and down with respect to gravity) or parallel to the top wall 48 (e.g., extending substantially horizontally side to side with respect to gravity).

The first attachment portion 66 can further include a first foot portion 70 disposed at an end of the first leg portion 68. The first foot portion 70 can assist in limiting the first attachment portion 66 from being removed from the drainage channel 40. The first foot portion 70 can be positioned on the first leg portion 68 at a location opposite from the contact portion 51. The first foot portion 70 can define a wider cross-sectional size than the first leg portion 68. The first foot portion 70 can include a generally circular cross-sectional shape, such that in FIG. 3, the first foot portion 70 can have a larger diameter than a width of the first leg portion 68. By having a generally wider cross-sectional size, the first foot portion 70 can assist in reducing the ease at which the resilient edge 50 can be removed from the drainage channel 40.

The first foot portion 70 can include a number of shapes and sizes, and is not limited to the structure of FIG. 3. For instance, the first foot portion 70 could include a number of different polygonal shapes such as squares, rectangles, triangles, or the like. Similarly, the first foot portion 70 can be integrally formed with the first leg portion 68, such that the first foot portion 70 and first leg portion 68 can be a single piece structure. In further examples, however, the first foot portion 70 could be attached to the first leg portion 68, such that the first foot portion 70 is a separate structure from the first leg portion 68. In addition, the first foot portion 70 is not limited to being positioned at the end of the first leg portion 68. Instead, the first foot portion 70 could be positioned at nearly any location along the length of the first leg portion 68, with the first foot portion 70 defining a wider cross-sectional size than the first leg portion 68.

Referring still to FIG. 3, the attachment structure 64 can further include a second attachment portion 80. The second attachment portion 80 can be cast into the concrete of remaining portions of the drainage channel 40, such that the second attachment portion 80 can assist in attaching the resilient edge 50 to the remaining portions of the drainage channel 40.

The second attachment portion 80 can include a second leg portion 82 that projects from the bottom wall 58 at a first end and into a second drainage channel recess 83 of the drainage channel 40 towards a second end. The second leg portion 82 can be positioned between the side wall 49 and the first attachment portion 66. The second leg portion 82 can extend in a substantially linear direction, such that the second leg portion 82 is straight. However, the second leg portion 82 could be non-linear in further examples, such as by having bends, curves, protrusions, or the like. The second leg portion 82 can be shorter in length than the first leg portion 68. However, the second leg portion 82 is not limited to such a size, and in further examples, could be shorter or longer than the length shown in FIG. 3. For instance, the second leg portion 82 could also be the same length as the second leg portion 82 or could be longer than the second leg portion 82. Similarly, the second attachment portion 80 could instead include the attachment structure 164 shown and described below with respect to FIGS. 7 to 9.

The second leg portion 82 can extend perpendicularly into the concrete with respect to the bottom wall 58. For instance, in one example, the second leg portion 82 can extend parallel to the side wall 49. In another example, the second leg portion 82 can extend substantially vertically with respect to gravity. It is to be appreciated that the second leg portion 82 can extend at any range of angles. For instance, the second leg portion 82 could extend towards or away from the side wall 49.

The second leg portion 82 can further include a second foot portion 84 disposed at an end of the second leg portion 82. The second foot portion 84 can assist in limiting the second attachment portion 80 from being removed from the drainage channel 40. The second foot portion 84 can be positioned on the second leg portion 82 at a location opposite from the contact portion 51. The second foot portion 84 can define a wider cross-sectional size than the second leg portion 82. The second foot portion 84 can include a generally circular cross-sectional shape, such that in FIG. 3, the second foot portion 84 can have a larger diameter than a width of the second leg portion 82. In other examples, however, the second foot portion 84 could include one side having a circular, rounded shape, while the other two sides can be substantially straight.

As with the first foot portion 70, the second foot portion 84 can include a number of different shapes and sizes, and is not limited to the structure of FIG. 3. For instance, the second foot portion 84 could include a number of different polygonal shapes such as squares, rectangles, triangles, or the like. Similarly, the second foot portion 84 can be integrally formed with the second leg portion 82, such that the second foot portion 84 and second leg portion 82 can be a single piece structure. In further examples, however, the second foot portion 84 could be attached to the second leg portion 82, such that the second foot portion 84 is a separate structure from the second leg portion 82. In addition, the second foot portion 84 is not limited to being positioned at the end of the second leg portion 82. Instead, the second foot portion 84 could be positioned at nearly any location along the length of the second leg portion 82, with the second foot portion 84 defining a wider cross-sectional size than the second leg portion 82.

The attachment of the resilient edge 50 to the remaining portions of the drainage channel 40 can now be described. The drainage channel 40 can be formed in a number of ways, such as by using a mold and/or pouring wet concrete into the mold. When the concrete of the drainage channel 40 is still wet, the resilient edge 50 can be attached. The resilient edge 50 can be cast into the wet concrete and positioned at the upper edge of the drainage channel 40. The attachment structure 64 can project into the wet concrete. Once the resilient edge 50 has been positioned, the drainage channel 40 can be allowed to cure and the concrete can harden. After the concrete hardens, the resilient edge 50 can be held by the drainage channel 40 and limited from being removed.

Figure 5:
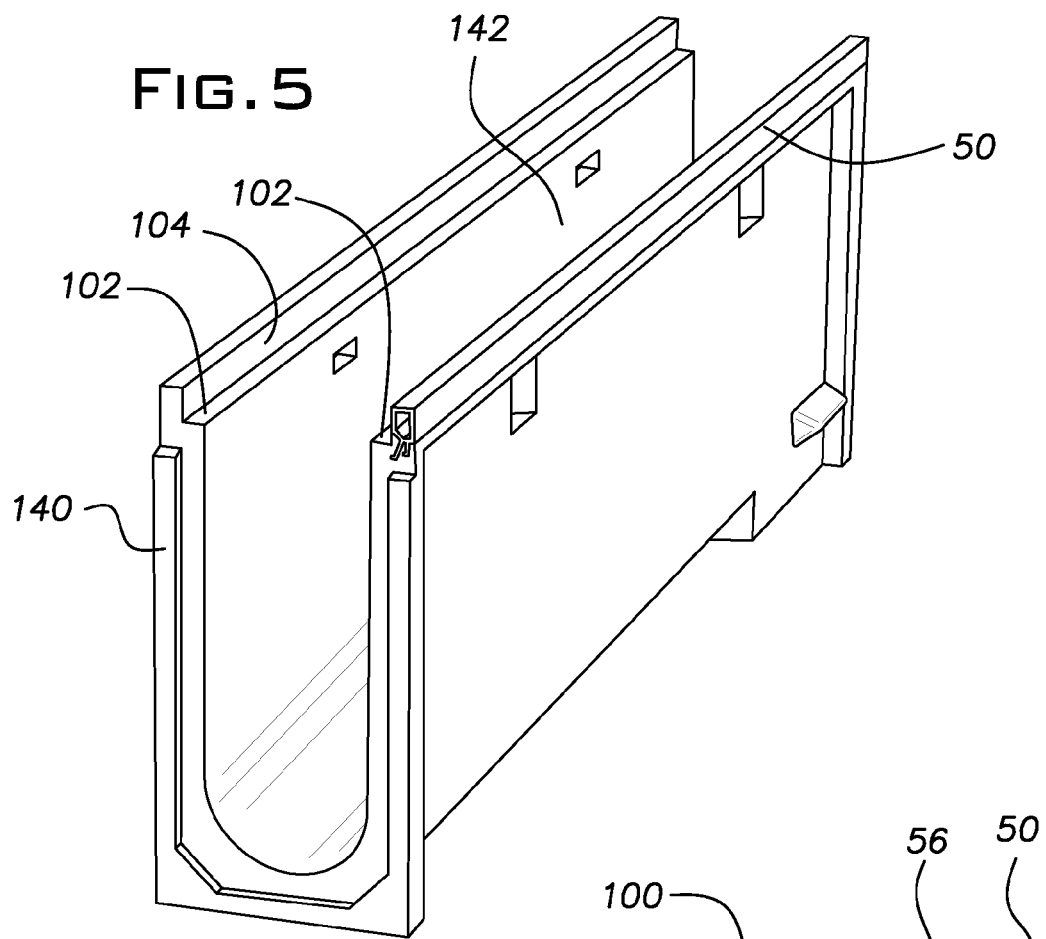
FIG. 5 illustrates a perspective view of another example drainage channel having a drainage channel configuration.
Figure 5A:
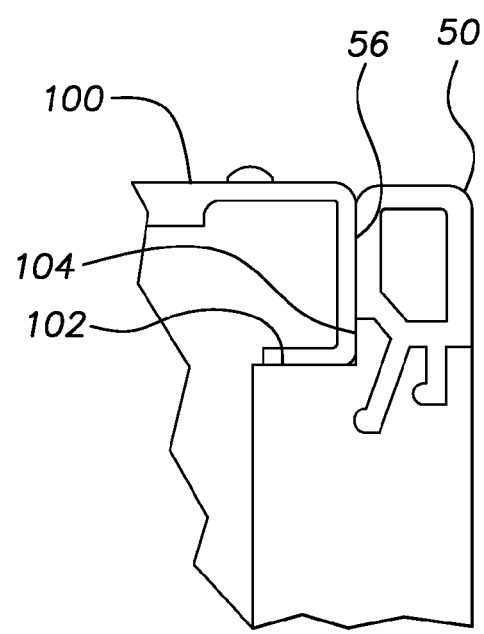
FIG. 5A illustrates an enlarged end view of a portion of the drainage channel and the drainage channel configuration.

Referring now to FIG. 5, another example of the drainage channel is shown. The drainage channel 140 (also shown in FIG. 2) can have similar or identical structures as discussed with respect to the drainage channel 40. As shown, the drainage channel 140 can include the opening 142 through which water, runoff, or the like can enter the drainage channel 140.

The drainage channel 140 can include the resilient edge 50 provided at an upper corner of the drainage channel 140 that may be positioned adjacent the grass surface 14. The resilient edge 50 can be identical in structure to the resilient edge 50 described above with respect to FIG. 3 and the drainage channel 40.

The drainage channel 140 can also include a grate 100. The grate 100 can extend longitudinally along the length of the drainage channel 140 and can extend across the width of the opening 142. The grate 100 can be formed of a number of different materials, such as metal, plastic, or the like, and can include one or more openings extending therethrough. As such, in one example, the grate 100 can allow for water, liquid, small debris, and the like to pass through the grate 100 while limiting the passage of larger debris through the grate 100 and into the drainage channel 140.

The drainage channel 140 can include a drainage seat 102. The drainage seat 102 can include a substantially planar ledge positioned at an upper wall of the drainage channel 140. The drainage seat 102 can extend longitudinally along the length of the drainage channel 140. The drainage seat 102 can be positioned on an inside wall of the drainage channel 140, such that the drainage seat 102 can receive the grate 100. More specifically, the combined width of the opening 142 and the drainage seat 102 can be sufficiently wide enough to be slightly wider than a width of the grate 100. As such, the grate 100 can rest on the drainage seat 102 with minimal risk of the grate 100 falling into the opening 142. While the drainage seat 102 is shown to extend perpendicularly to a drainage channel wall in a substantially horizontal direction, the drainage seat 102 can extend in any number of directions and could comprise a number of shapes and sizes. For instance, the drainage seat 102 could have a width that is larger or smaller while still retaining the ability to support the grate 100.

The drainage channel 140 can further include a drainage back 104. The drainage back 104 can extend longitudinally along the length of the drainage channel 140. The drainage back 104 can project upwardly at an end of the drainage seat 102. The drainage back 104 can extend in a substantially perpendicular direction with respect to the drainage seat 102, however, other angles and orientations are envisioned. The drainage back 104 can be spaced apart a sufficient distance from a corresponding drainage back 104 on an opposing wall of the drainage channel 140 that the grate 100 can fit between the opposing drainage backs 104. More specifically, a distance separating the opposing drainage backs 104 can be larger or slightly larger than a width of the grate, such that the grate 100 can be supported by the drainage backs 104. Together, the drainage backs 104 can limit and/or reduce lateral movement of the grate 100 with respect to the drainage channel 140. In one example, the drainage back 104 can contact the grate 100, however, in further examples, the drainage back 104 can be spaced a distance apart from the grate 100.

The drainage back 104 can define a support surface upon which the resilient edge 50 can rest. Specifically, a lower surface of the second side wall 56 can rest on top of the drainage back 104. Accordingly, in this example, the drainage channel 140 may not include a structure similar to top wall 48. Rather, the second side wall 56 can rest atop the drainage back 104 and can contact the grate 100. In this example, the resilient edge 50 can both increase comfort by being elastically deformable and can also provide a support surface for the grate 100. As shown in FIG. 5, the second side wall 56 can contact lateral edges of the grate 100 and assist the drainage back 104 in reducing lateral movement of the grate 100 with respect to the drainage channel 140.

In further examples, the drainage channel 140 may not include the drainage back 104. Instead, the grate 100 could rest on the drainage seat 102 with the second side wall 56 forming a rear surface against which the grate 100 can contact. In this example, the lower surface of the second side wall 56 could rest on the drainage seat 102.

Figure 6:
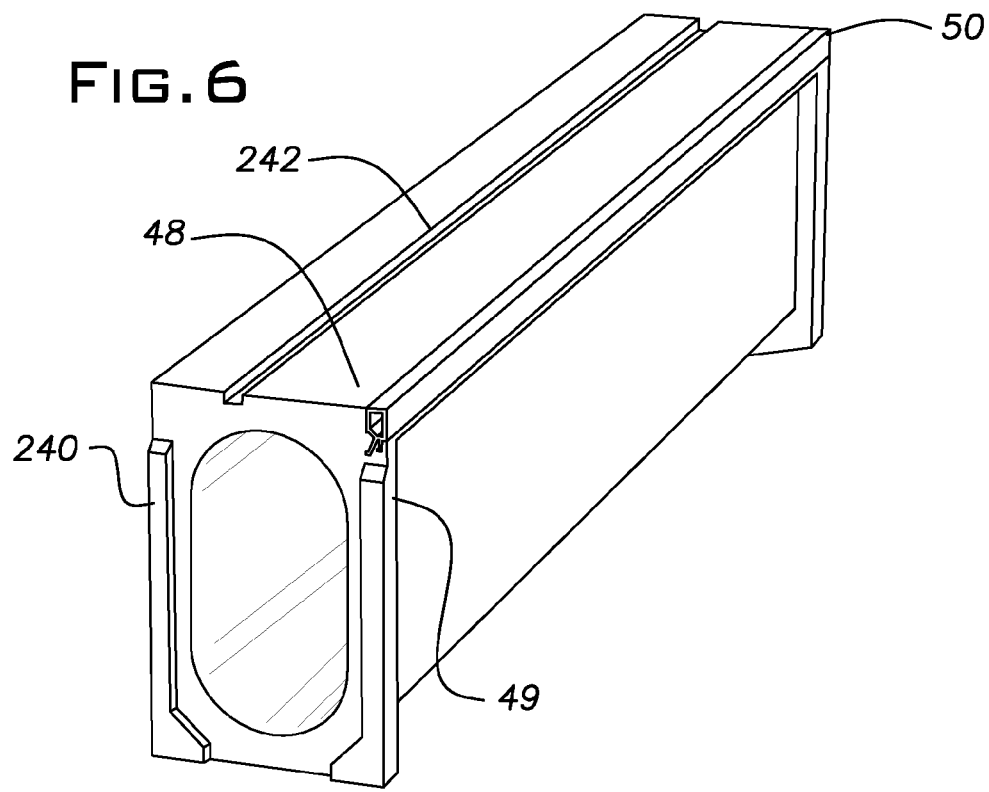
FIG. 6 illustrates a perspective view of yet another example drainage channel having a drainage channel configuration.
Figure 6A:
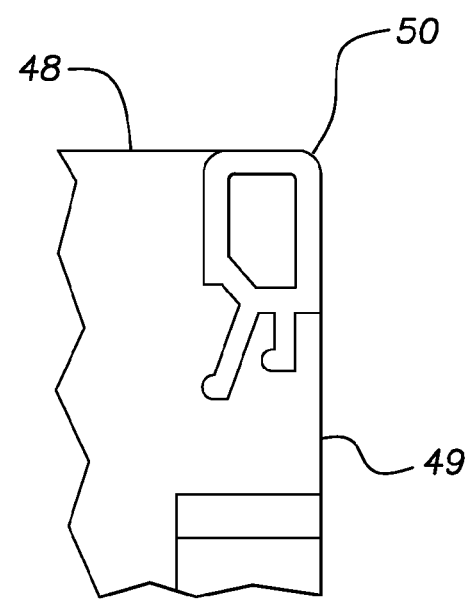
FIG. 6A illustrates an enlarged end view of a portion of the drainage channel and the drainage channel configuration.

Referring now to FIG. 6, yet another drainage channel example is shown. The drainage channel 240 can have similar or identical structures with the drainage channel 40 and drainage channel 140. The drainage channel 240 can include an opening 242 through which water, runoff, or the like can enter the drainage channel 240. The drainage channel 240 can be oriented in an identical manner as the drainage channel 140 shown in FIG. 2. As shown, the drainage channel 240 can be positioned between a track surface 12 and a grass surface 14, with the resilient edge 50 positioned adjacent the grass surface 14.

The drainage channel 240 can include the resilient edge 50 provided at an upper corner of the drainage channel 240 adjacent the grass surface 14. The resilient edge 50 can be identical in structure to the resilient edge 50 described above with respect to the drainage channel 40 and drainage channel 140.

Figure 7:
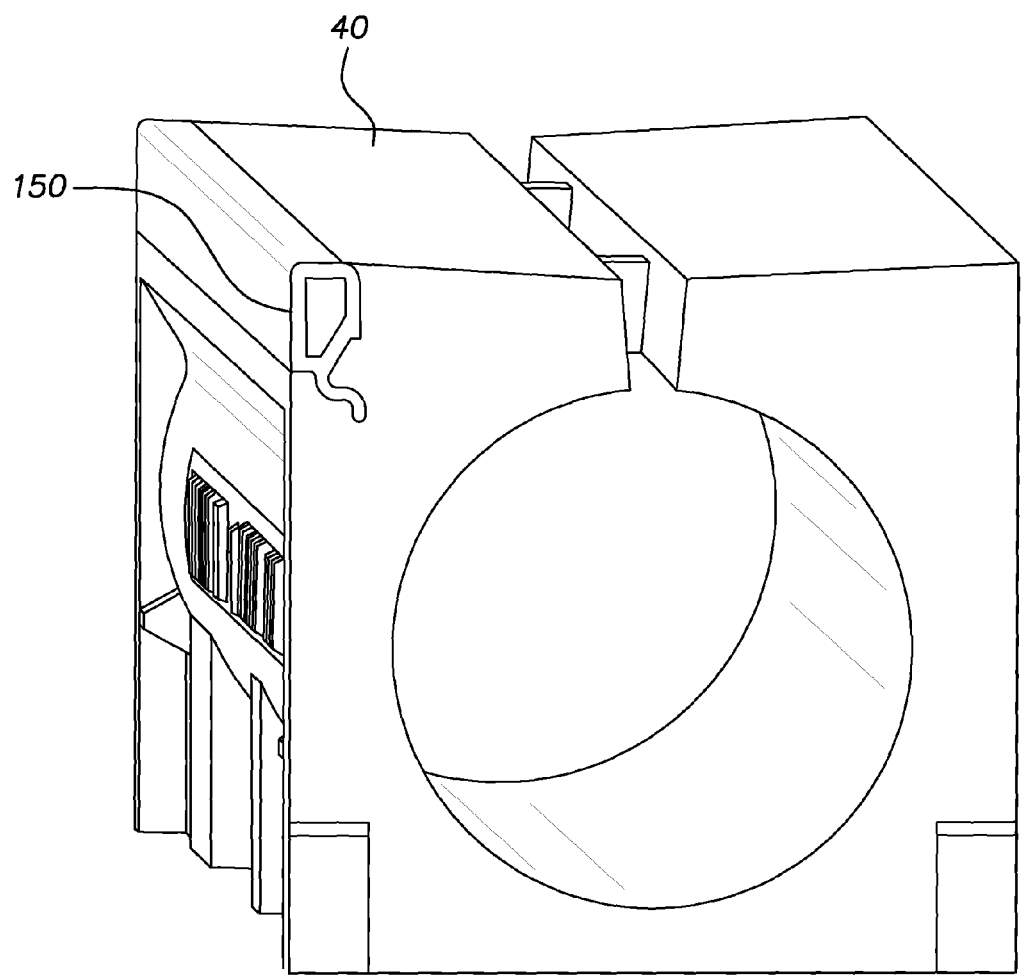
FIG. 7 is a perspective view of another example drainage channel with a drainage channel configuration.

Referring now to FIGS. 7-9, another example of a resilient edge 150 is shown. Like resilient edge 50, resilient edge 150 can be provided at an upper corner of a drainage channel 40, 140, 240 adjacent the grass surface 14. While FIGS. 7 and 8 depict the drainage channel 40 having resilient edge 150, nearly any drainage channel, including the drainage channels shown and described herein (drainage channel 40, drainage channel 140, drainage channel 240), could include resilient edge 150. As such, FIGS. 7 and 8 are merely intended to depict the resilient edge 150 in one possible embodiment.

Referring to FIG. 8, like resilient edge 50, resilient edge 150 can include a flexible, elastically deformable material that is softer than the remaining portions drainage channel material (concrete, in one example). More specifically, resilient edge 150 can have a reduced resistance to external force as compared to the remaining portions of the drainage channel 40. The resilient edge 150 can comprise any number of elastically deformable materials. For instance, the resilient edge 150 can include a polyvinylchloride, vinyl rubber, nearly any type of elastomer, or the like. The resilient edge 150 is not limited to these materials, however.

The resilient edge includes an elongated body with a generally rectangular shaped cross-section. A substantially hollowed portion extends longitudinally through the body. Accordingly, the resilient edge includes an opening 153 extending longitudinally through a central portion thereof. As will be described below, the opening 153 can allow the resilient edge 150 to deform, such that a contact portion 151 can deflect inward towards the opening 153, thereby allowing the second resilient edge 150 to be flexible and elastically deformable.

The contact portion 151 can define an upper portion of the resilient edge 150. The contact portion 151 can include a top wall 152 defining a top surface of the resilient edge 150. The resilient edge 150 can be arranged such that the top wall 152 can be substantially flush with the top wall 48 of the drainage channel 40. As shown, the top wall 152 and top wall 48 can, together, define a substantially level upper surface of the drainage channel 40. The placement of the resilient edge 150 need not be limited to the example shown herein. Rather, the resilient edge 150 could be arranged with the top wall 152 slightly higher or above the top wall 48, such that the top wall 152 defines an upward step from the top wall 48. Along these lines, the resilient edge 150 could also be arranged with the top wall 152 slightly lower than or below the top wall 48 such that the top wall 152 defines a downward step from the top wall 48. Accordingly, by being substantially level, the top wall 152 and top wall 48 are not limited to forming a perfectly planar surface. The top wall 152 can be positioned in relatively close proximity to the top wall 48 such that no gap or a relatively small gap exists between the top wall 152 and top wall 48. Accordingly, the top wall 152 and top wall 48 can be in close proximity such that the resilient edge 150 can abut and/or contact the drainage channel 40.

The top wall 152 can include a number of different sizes and shapes. For instance, in one example, the top wall 152 can have a length from a first side wall 154 to an second side wall 156 of about 14 millimeters (0.55 inches). However, the top wall 152 could be longer or shorter in other examples. Similarly, the top wall 152 can include a slightly rounded, beveled edge, though, in other examples, the top wall 152 could have square edges, or the like.

The top wall 152 can be elastically deformable such that the top wall 152 can deflect. More specifically, if the top wall 152 is contacted or a force is applied, the top wall 152 can deflect inwardly towards the opening 153 or outwardly away from the opening 153. Accordingly, in one example, an athlete playing on the grass surface 14 may come into contact with the top wall 152. Due to the flexible, elastically deformable characteristics of the second resilient edge 150, the top wall 152 can deform in response to the force from the athlete.

The contact portion 151 can further include a first side wall 154 defining a side outer surface of the second resilient edge 150. The resilient edge 150 can be arranged such that the first side wall 154 can be substantially flush with the side wall 49 of the drainage channel 40. As shown, the first side wall 154 and side wall 49 can, together, define a substantially level outer side surface of the drainage channel 40. The placement of the resilient edge 150 need not be limited to the example shown herein. Rather, the resilient edge 150 could be arranged with the first side wall 154 offset with respect to the side wall 49, such that the first side wall 154 and side wall 49 define a non-planar surface. Along these lines, the resilient edge 150 could be arranged with the first side wall 154 extending further out or further in with respect to the side wall 49. Accordingly, by being substantially level, the first side wall 154 and side wall 49 are not limited to forming a perfectly planar surface. Furthermore, the first side wall 154 can be positioned in relatively close proximity to the side wall 49 such that no gap or a relatively small gap exists between the first side wall 154 and side wall 49.

The first side wall 154 can include a number of different sizes and shapes. For instance, in one example, the first side wall 154 can have a length of about 20 millimeters (0.78 inches). However, the first side wall 154 could be longer or shorter in other examples. Similarly, the first side wall 154 can include a slightly rounded, beveled edge at one end (top end) and a square edge at an opposing second end (bottom end). However, in further examples, either or both of the ends of the first side wall 154 could have square edges, rounded beveled edges, or the like.

The resilient edge 150 can further include a second side wall 156 and a bottom wall 158. The resilient edge 150 can also include an intermediate wall 160 attaching the second side wall 156 and bottom wall 158. As such, the second side wall 156 can extend between the top wall 152 at one end and the intermediate wall 160 at an opposing second end. The second side wall 156 can substantially form a right angle with the top wall 152, such that an internal angle between the second side wall 156 and top wall 152 is about 90°. The bottom wall 158 can extend between the first side wall 154 at one end and the intermediate wall 160 at an opposing second end. As with the second side wall 156, the bottom wall 158 can also substantially form a right angle with the first side wall 154, such that an internal angle between the bottom wall 158 and first side wall 154 is about 90°. The intermediate wall 160 can extend diagonally between the second side wall 156 and bottom wall 158.

The sizes, shapes, and angles of the resilient edge 150 shown and described herein are merely one possible example and are not intended to be limiting. For instance, the internal angle between either of the second side wall 156 and top wall 152 or the bottom wall 158 and first side wall 154 need not be limited to 90°. Rather, a wide range of angles can be provided. Similarly, while the intermediate wall 160 is shown to extend diagonally between the second side wall 156 and bottom wall 158, other angles or orientations of the intermediate wall 60 are envisioned. Even further, the intermediate wall 160 may not be provided at all in some examples, such that the second side wall 156 can be attached directly to the bottom wall 158. As such, the sizes, lengths, thicknesses, shapes, etc. of any of the walls can be varied while the second resilient edge 150 still retains a similar function.

Referring still to FIG. 8, the resilient edge 150 can further include an attachment structure 164. The attachment structure 164 assists in securing the resilient edge 150 to the drainage channel 40. The attachment structure 164 can extend from the bottom wall 158 and into the drainage channel 40, though other locations and orientations of the attachment structure 164 are envisioned.

The attachment structure 164 can be cast into the concrete of the drainage channel 40, such that the attachment structure 164 can attach the resilient edge 150 to the drainage channel 40. The attachment structure 164 can include a leg portion 168 that projects from the bottom wall 158 at a first end and into a drainage channel recess of the drainage channel 40 towards a second end. The leg portion 168 can extend non-linearly into the drainage channel 40, and can include one or more bends, curves, or the like. In the shown example, the leg portion 168 includes a substantially 90° bend, though any number of sizes, angles, and orientations are contemplated. For instance, in a further example, the leg portion 168 could be substantially straight and can extend linearly, similar to the first leg portion 68 shown in FIG. 3.

The attachment structure 164 can further include a foot portion 170 disposed at an end of the leg portion 168. The foot portion 170 can assist in limiting the attachment structure 164 from being removed from the drainage channel 40. The foot portion 170 can be positioned on the leg portion 168 at a location opposite from the bottom wall 158. The foot portion 170 can form a bend with respect to the leg portion 168. In the shown example, the foot portion 170 can form a substantially 90° bend from the leg portion 168. The foot portion 170 can be bent in a downward direction (i.e., in a direction away from the top wall 48 and substantially parallel to the side wall 49). However, the foot portion 170 could take on different shapes, sizes, and orientations. For instance, the foot portion 170 could be bent in an upward direction (i.e., in a direction towards the top wall 48). Similarly, the foot portion 170 could be identical to either of the foot portion 70 or second foot portion 84 by having a larger cross-sectional thickness than the leg portion 168. In this example, the foot portion 170 could include a number of shapes and sizes, such as polygonal shapes including squares, rectangles, triangles, or the like.

The foot portion 170 can be integrally formed with the leg portion 168, such that the foot portion 170 and leg portion 168 can be a single piece structure. In further examples, however, the foot portion 170 could be attached to the leg portion 168, such that the foot portion 170 is a separate structure from the leg portion 168. In addition, the foot portion 170 is not limited to being positioned at the end of the leg portion 168. Instead, the foot portion 170 could be positioned at nearly any location along the length of the leg portion 168, with the foot portion 170 defining a wider cross-sectional size than the leg portion 168. As such, the foot portion 170 shown in FIG. 8 is not intended to be limiting on further examples of the attachment structure 164.

The attachment of the resilient edge 150 to the remaining portions of the drainage channel 40 can be similar or identical to the attachment of the resilient edge 50 to the remaining portions of the drainage channel 40. Specifically, when the concrete of the drainage channel 40 is still wet, the resilient edge 150 can be attached. The resilient edge 150 can be cast into the wet concrete and positioned at the upper edge of the drainage channel 40. The attachment structure 164 can project into the wet concrete to form a drainage channel recess. Once the resilient edge 150 has been positioned, the drainage channel 40 can be allowed to cure and the concrete can harden. Once the concrete hardens, the resilient edge 150 can be held by the drainage channel 40 and limited from being removed. A similar or identical process can be used to attach the resilient edge 150 to other drainage channels, including drainage channel 140 and drainage channel 240.

The resilient edge can encompass a number of different structures described herein. For instance, any of the drainage channel 40, drainage channel 140, or drainage channel 240 could include either resilient edge 50, resilient edge 150, or variations thereof. In one example variation, the resilient edge could include features from either or both of the resilient edge 50 or resilient edge 150. For example, the resilient edge 50 shown and described with respect to FIG. 3 could include either or both of the first attachment portion 66 or second attachment portion 80 being replaced with the attachment structure 164 shown in FIG. 8. Similarly, the resilient edge 150 could include either of the first attachment portion 66 or second attachment portion 80 instead of the attachment structure 164.

The invention claimed is:

1. A drainage channel and an edge configuration for the drainage channel, the drainage channel comprising at least one of a drainage seat configured to receive a grate and a recessed corner defined between a top wall of the drainage channel and a side wall of the drainage channel, the edge configuration being arranged in the recessed corner; the edge configuration comprising:
an elongated body formed of an elastically deformable material;
a hollowed portion extending longitudinally through the elongated body; and
an attachment structure extending from a bottom wall of the elongated body into the drainage channel, wherein the attachment structure secures the elongated body to the drainage channel, and
wherein the elongated body includes at least four walls surrounding and enclosing the hollowed portion within the elongated body.

2. The drainage channel and the edge configuration of claim 1, wherein the attachment structure includes a first leg that extends diagonally from the bottom wall of the elongated body.

3. The drainage channel and the edge configuration of claim 2, wherein the first leg extends from the bottom wall of the elongated body at about an angle of 110-degrees.

4. The drainage channel and the edge configuration of claim 1, wherein the attachment structure includes a first leg and a first foot disposed at an end of the first leg.

5. The drainage channel and the edge configuration of claim 4, wherein the first foot has a wider cross-sectional size than the first leg.

6. The drainage channel and the edge configuration of claim 1, wherein the elongated body and the attachment structure are monolithically formed as a one piece structure.

7. The drainage channel and the edge configuration of claim 1, wherein the attachment structure includes a first leg and a second leg, each extending from a wall of the elongated body.

8. The drainage channel and the edge configuration of claim 7, wherein the first leg extends from a bottom wall of the elongated body at an angle greater than 100-degrees and wherein the second leg extends from the bottom wall of the elongated body at an angle of about 90-degrees.

9. The drainage channel and the edge configuration of claim 1, wherein the elongated body and the attachment structure together have a substantially R-shaped cross-section.

10. The drainage channel and the edge configuration of claim 1, wherein the attachment structure includes a leg extending from a bottom wall of the elongated body in a non-linear manner.

11. A drainage channel and an edge configuration for the drainage channel, the edge configuration comprising:
an elongated hollow body; and
a first attachment portion extending from the elongated body, wherein the first attachment portion secures the elongated body to the drainage channel, and
wherein the first attachment portion extends diagonally from a bottom wall of the elongated body into the drainage channel, the elongated hollow body being arranged in a recessed corner of the drainage channel, the recessed corner being defined between a top wall of the drainage channel and a side wall of the drainage channel.

12. The drainage channel and the edge configuration of claim 11, further comprising a second attachment portion extending from the bottom wall of the elongated body.

13. The drainage channel and the edge configuration of claim 12, wherein the second attachment portion extends perpendicularly from the bottom wall of the elongated body.

14. The drainage channel and the edge configuration of claim 12, wherein the second attachment portion is of a different length than the first attachment portion.

15. The drainage channel and the edge configuration of claim 11, wherein the elongated body is defined by the bottom wall, a top wall, a first side wall, a second side wall, and an intermediate wall, the intermediate wall being positioned between the bottom wall and the second side wall.

16. The drainage channel and the edge configuration of claim 11, wherein the first attachment portion comprises a leg having a first end and a second end, the first end of the leg being attached to the bottom wall of the elongated body and the second end of the leg being attached to a foot.

17. The drainage channel and the edge configuration of claim 16, wherein the foot extends substantially perpendicularly from the leg.

18. A drainage channel comprising:
   a drainage channel body configured to receive runoff from an adjacent surface; and
   a resilient edge secured to the drainage channel body; and
   at least one of a drainage seat configured to receive a grate and a recessed corner defined between a top wall of the drainage channel and a side wall of the drainage channel, the resilient edge being arranged in the recessed corner,
   wherein the resilient edge includes an opening extending longitudinally therethrough formed by at least four walls enclosing the opening and the resilient edge secured to the drainage channel body by a first attachment portion that extends from a bottom wall of the resilient edge.

19. The drainage channel of claim 18, wherein the resilient edge is secured to the drainage channel body via the first attachment portion and a second attachment portion.

20. The drainage channel of claim 19, wherein the first attachment portion extends diagonally from a bottom wall of the resilient edge and the second attachment portion extends perpendicularly from the bottom wall of the resilient edge.

* * * * *